(12) United States Patent
Potter et al.

(10) Patent No.: US 12,291,220 B2
(45) Date of Patent: May 6, 2025

(54) SYSTEMS AND METHODS FOR COLLECTION AND ANALYSIS OF VEHICULAR DATA

(71) Applicant: GM GLOBAL TECHNOLOGY OPERATIONS LLC, Detroit, MI (US)

(72) Inventors: Janean Ellen Potter, Northville, MI (US); Erika L Pruski, Brighton, MI (US); Rafat F Hattar, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 226 days.

(21) Appl. No.: 18/172,876

(22) Filed: Feb. 22, 2023

(65) Prior Publication Data

US 2024/0278793 A1 Aug. 22, 2024

(51) Int. Cl.
*B60W 50/02* (2012.01)
*G07C 5/00* (2006.01)

(52) U.S. Cl.
CPC .... *B60W 50/0205* (2013.01); *B60W 50/0225* (2013.01); *G07C 5/008* (2013.01)

(58) Field of Classification Search
CPC .......... B60W 50/0205; B60W 50/0225; G07C 5/008; G07C 5/0808; G07C 5/085; G07C 5/0841; H04L 67/12
See application file for complete search history.

(56) References Cited

U.S. PATENT DOCUMENTS

| | | | | |
|---|---|---|---|---|
| 2018/0322711 | A1* | 11/2018 | Weimerskirch | ........ G06N 20/00 |
| 2022/0161815 | A1* | 5/2022 | Van Beek | ....... B60W 60/00274 |
| 2023/0399001 | A1* | 12/2023 | Bandi | .................... B60W 10/26 |
| 2024/0062589 | A1* | 2/2024 | Song | ........................ G07C 5/06 |

* cited by examiner

*Primary Examiner* — Brian P Sweeney
(74) *Attorney, Agent, or Firm* — Lorenz & Kopf LLP

(57) ABSTRACT

Systems and methods are provided for vehicular data collection and analysis. The system may include a vehicle and a remote computing system. The vehicle may include a sensor system, a communication system, a controller configured to: receive vehicle data including sensor data that includes an observable condition of the vehicle as sensed with the sensor system, process the vehicle data to produce collected data, store the collected data as stored data in a data storage device of the vehicle, and upload the stored data through a communication network. The remote computing system may include a controller configured to, by a processor: receive the vehicle data, and perform statistical analysis thereof to quantify a change of the observable condition relative to historical data associated with the vehicle and relative to other vehicles within a fleet.

15 Claims, 8 Drawing Sheets

SYSTEMS AND METHODS FOR COLLECTION AND ANALYSIS OF VEHICULAR DATA

INTRODUCTION

The technical field generally relates to vehicular data collection and analysis, and more particularly relates to a system for collecting and transmitting vehicle data to a remote computing device for analysis thereof.

Sensor systems onboard modern vehicles are capable of collecting significant amounts of data relating to the operation of the vehicles. Analysis of this data has significant potential for various applications. However, the vehicles have limited data storage capacities and processing capabilities. These limitations may preclude and/or hinder the usefulness of the data and/or analysis thereof. Furthermore, such data may be limited to data generated and stored onboard the vehicle, and therefore may not be able to consider historical data associated with the vehicle and/or data associated with fleets of vehicles.

Accordingly, it is desirable to provide a system capable of collecting and analyzing data associated with a vehicle. In addition, it is desirable to provide a system capable of analyzing data associated with a fleet of vehicles. Furthermore, other desirable features and characteristics of the present invention will become apparent from the subsequent detailed description and the appended claims, taken in conjunction with the accompanying drawings and the foregoing technical field and background.

SUMMARY

A vehicle is provided that includes a sensor system having a sensing device configured to sense an observable condition of the vehicle, a communication system, a controller configured to, by a processor: receive vehicle data including sensor data that includes the observable condition of the vehicle as sensed with the sensor system, process the vehicle data including binning the vehicle data based on predetermined inputs to produce collected data, store the collected data as stored data in a data storage device of the vehicle, and upload the stored data through a communication network to a remote computing system that is remote from the vehicle with the communication system.

In various embodiments, the controller is configured to, by the processor: monitor the sensor data, receive and monitor model data that includes an estimation of the observable condition of the vehicle, compare the sensor data and the model data to preprogrammed entry conditions, and process the vehicle data in response to a determination that at least one of the sensor data and the model data meet the entry conditions.

In various embodiments, the controller is configured to, by the processor: determine whether a calibration identification (CALID) and a calibration verification number (CVN) of the vehicle matches a CALID and a CVN of a manufacturer for the vehicle, determine whether faults are active in an onboard diagnostics (OBD) system of the vehicle, and determine that are not met if the CALID or the CVN of the vehicle does not match the CALID or the CVN of the manufacturer for the vehicle, or if active faults are detected in the OBD system.

In various embodiments, the controller is configured to, by the processor: receive the sensor data, model data that includes an estimation of the observable condition of the vehicle, calculated data that includes values determined based on both the sensor data and the model data, and performance data that includes information related to operation of the vehicle, and collect a snapshot of the sensor data, the model data, the calculated data, and the performance data to define the vehicle data.

In various embodiments, the controller is configured to, by the processor: detect a collection trigger indicating that the stored data is stored as in the data storage device of the vehicle, monitor for fulfillment of preprogrammed upload conditions in response to detection of the collection trigger, and upload the stored data to the remote computing system in response to a determination that the upload conditions are fulfilled.

A system is provided for vehicular data collection and analysis. In one embodiment, the system includes a vehicle and a remote computing system that is remote from the vehicle. The remote computing system includes a controller configured to, by a processor: receive vehicle data from the vehicle, and perform statistical analysis of the vehicle data to quantify a change an observable condition of the vehicle relative to historical data associated with the vehicle and relative to other vehicles within a fleet associated with the vehicle. The vehicle includes a sensor system having a sensing device configured to sense the observable condition of the vehicle, a communication system configured to communicate information to and from the remote computing system, and a controller configured to, by a processor: receive the vehicle data including sensor data that includes the observable condition of the vehicle as sensed with the sensor system, process the vehicle data to define collected data, store the collected data as stored data in a data storage device onboard the vehicle, and upload the stored data through a communication network to the remote computing system with the communication system.

In various embodiments, the remote computing system includes one or more backend server systems.

In various embodiments, the controller of the vehicle is configured to, by the processor of the vehicle: monitor the sensor data, receive and monitor model data that includes an estimation of the observable condition of the vehicle, compare the sensor data and the model data to preprogrammed entry conditions, and process the vehicle data in response to a determination that at least one of the sensor data and the model data meet the entry conditions.

In various embodiments, the controller of the vehicle is configured to, by the processor of the vehicle: determine whether a calibration identification (CALID) and a calibration verification number (CVN) of the vehicle matches a CALID and a CVN of a manufacturer for the vehicle, determine whether faults are active in an onboard diagnostics (OBD) system of the vehicle, and determine that the entry conditions are not met if the CALID or the CVN of the vehicle does not match the CALID or the CVN of the manufacturer for the vehicle, or if active faults are detected in the OBD system.

In various embodiments, the controller of the vehicle is configured to, by the processor of the vehicle: receive the sensor data, model data that includes an estimation of the observable condition of the vehicle, calculated data that includes values determined based on both the sensor data and the model data, and performance data that includes information related to operation of the vehicle, collect a snapshot of the sensor data, the model data, the calculated data, and the performance data to define the vehicle data, and bin the vehicle data based on predetermined inputs to produce the collected data.

In various embodiments, the controller of the vehicle is configured to, by the processor of the vehicle: detect a collection trigger indicating that the stored data is stored as in the data storage device of the vehicle, monitor for fulfillment of preprogrammed upload conditions in response to detection of the collection trigger, and upload the stored data to the remote computing system in response to a determination that the upload conditions are fulfilled.

In various embodiments, the controller of the remote computing system is configured to, by the processor of the remote computing system: determine whether a drift in performance of the vehicle has occurred both over time and relative to the fleet based on the statistical analysis, and determine whether the performance of the vehicle exceeds a preprogrammed performance condition in response to the determination that the drift in the performance of the vehicle has occurred.

In various embodiments, the controller of the remote computing system is configured to, by the processor of the remote computing system, perform a corrective action in response to the determination that the performance of the vehicle exceeds the preprogrammed performance condition.

A method is provided for vehicular data collection and analysis. In one embodiment, the method includes receiving, with a processor of a vehicle, vehicle data that includes sensor data including an observable condition of the vehicle as sensed with a sensing device of a sensor system of the vehicle, processing, by the processor of the vehicle, the vehicle data to define collected data, storing, by the processor of the vehicle, the collected data as stored data in a data storage device onboard the vehicle, uploading, by the processor of the vehicle, the stored data through a communication network to a remote computing system with a communication system of the vehicle, and performing statistical analysis of the stored data, with a processor of the remote computing system, to quantify a change in the observable condition of the vehicle relative to historical data associated with the vehicle and relative to other vehicles within a fleet associated with the vehicle.

In various embodiments, the method includes, by the processor of the vehicle: monitoring the sensor data, receiving and monitoring model data that includes an estimation of the observable condition of the vehicle, comparing the sensor data and the model data to preprogrammed entry conditions, and processing the vehicle data in response to a determination that at least one of the sensor data and the model data meet the entry conditions.

In various embodiments, the method includes, by the processor of the vehicle: determining whether a calibration identification (CALID) and a calibration verification number (CVN) of the vehicle matches a CALID and a CVN of a manufacturer for the vehicle, determining whether faults are active in an onboard diagnostics (OBD) system of the vehicle, and determining that the entry conditions are not met if the CALID or the CVN of the vehicle does not match the CALID or the CVN of the manufacturer for the vehicle, or if active faults are detected in the OBD system.

In various embodiments, the method includes, by the processor of the vehicle: receiving the sensor data, model data that includes an estimation of the observable condition of the vehicle, calculated data that includes values determined based on both the sensor data and the model data, and performance data that includes information related to operation of the vehicle, collecting a snapshot of the sensor data, the model data, the calculated data, and the performance data to define the vehicle data, and binning the vehicle data based on predetermined inputs to produce the collected data.

In various embodiments, the method includes, by the processor of the vehicle: detecting a collection trigger indicating that the stored data is stored in the data storage device of the vehicle, monitoring for fulfillment of preprogrammed upload conditions, and uploading the stored data to the remote computing system in response to a determination that the upload conditions are fulfilled.

In various embodiments, the method includes, by the processor of the remote computing system: determining whether a drift in performance of the vehicle has occurred both over time and relative to the fleet based on the statistical analysis, and determining whether the performance of the vehicle exceeds a preprogrammed performance condition in response to a determination that the drift in the performance of the vehicle has occurred.

In various embodiments, the method includes, by the processor of the remote computing system, performing a corrective action in response to the determination that the performance of the vehicle exceeds the preprogrammed performance condition.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
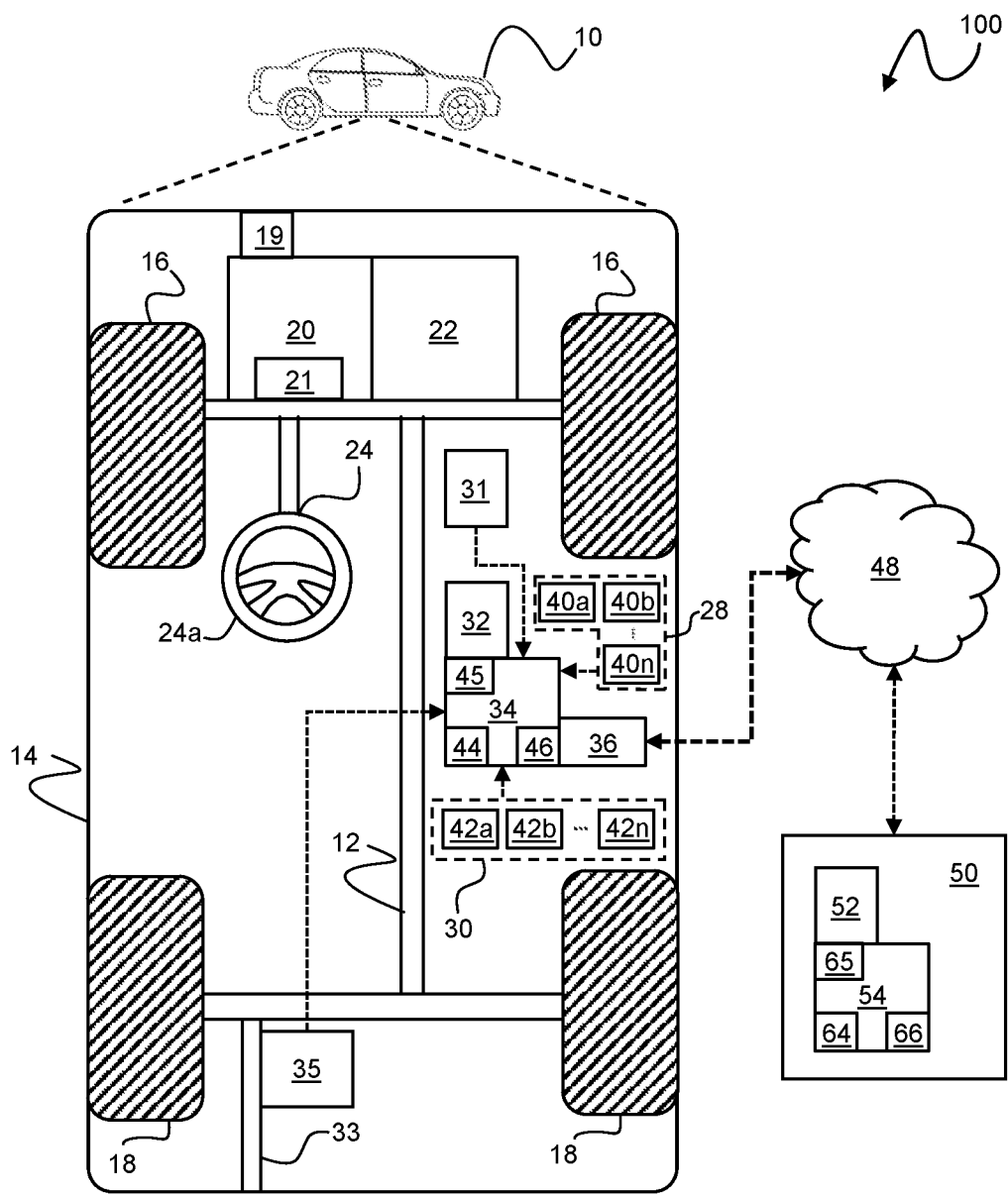
FIG. 1 is a functional block diagram illustrating a data collection and analysis system for a vehicle in accordance with various embodiments.

With reference to FIG. 1, a data collection and analysis system shown generally at 100 is associated with a vehicle 10 and a remote computing system 50 in accordance with various embodiments. In general, the system 100 collects data associated with the vehicle 10, transmits the collected data to the remote computing system 50 through a communication network 48, and analyses the collected data with the remote computing system 50 to determine statistical information associated with the vehicle 10. The data may include various operating conditions of the vehicle 10 that may include, for example, performance of one or more systems or devices of the vehicle 10. Nonlimiting examples may include performance of an emissions system, a battery system, etc. The analysis performed by the remote computing system 50 may provide statistical information useful for purposes such as, but not limited to, component development, maintenance and/or repair recommendations, regulatory compliance, system software updates, etc.

In certain embodiments, the vehicle 10 comprises an automobile. In various embodiments, the vehicle 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In addition, in various embodiments, it will also be appreciated that the vehicle 10 may comprise any number of other types of mobile platforms.

As depicted in FIG. 1, the exemplary vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

The vehicle 10 generally includes a propulsion system 20, a transmission system 22, a steering system 24, a sensor system 28, actuator system 30, at least one data storage device 32, an optional exhaust system 33, at least one controller 34, and a communication system 36. The propulsion system 20 may, in various embodiments, include an engine 21, such as a gasoline or diesel fueled combustion engine, an electric engine, other type of fuel consuming engine. The transmission system 22 is configured to transmit power from the propulsion system 20 to the wheels 16-18 according to selectable speed ratios. According to various embodiments, the transmission system 22 may include a step-ratio automatic transmission, a continuously variable transmission, or other appropriate transmission. The steering system 24 influences a position of the wheels 16-18. While depicted as including a steering wheel for illustrative purposes, in some embodiments contemplated within the scope of the present disclosure, the steering system 24 may not include a steering wheel.

For embodiments in which the engine 21 is a fuel-burning engine, the engine 21 may be naturally aspirated or in other embodiments may include a turbocharger or supercharger to pump air into the engine 21 for combustion purposes. In such embodiments, the vehicle 10 includes the exhaust system 33 for conveying exhaust gases from combustion chambers of the engine 21 to a tailpipe section for discharge to the atmosphere. One or more pipe sections may couple the engine 21, such as from exhaust manifolds of the engine 21, to aftertreatment devices of an emissions control system 35 prior to discharge at the tailpipe section.

The emissions control system 35 may include various aftertreatment devices for reducing the emissions from the engine 21. In various embodiments, the emissions control system 35 includes one or more catalytic converter(s). The catalytic converter(s) may be two-way, or three-way type. When configured as a two-way type, the catalytic converter(s) convert two components in the exhaust gas stream, including carbon monoxide (CO) and hydrocarbons (HC), to other constituents. When configured as a three-way type, the catalytic converter(s) convert three components in the gas stream to other elements or compounds including converting carbon monoxide (CO), hydrocarbons (HC), and nitrogen oxides ($NO_x$) to innocuous elements or compounds (e.g., carbon dioxide ($CO_2$), nitrogen ($N_2$), and water ($H_2O$)). The catalytic converter(s) may contain catalysts such as platinum, palladium, or other materials.

In various embodiments in which the engine 21 is diesel fueled combustion engine, the emissions control system 35 may include various aftertreatment devices such as a diesel oxidation catalyst (DOC), a diesel particulate filter (DPF), a urea dosing system, a decomposition reactor, an exhaust mixer, selective catalytic reduction (SCR) system, and/or an ammonia slip catalyst (ASC) system.

For embodiments in which the engine 21 is not a fuel-burning engine (e.g., electric engine), the exhaust system 33 and the emissions control system 35 may be omitted.

The sensor system 28 includes one or more sensing devices 40a-40n that sense observable conditions of the exterior environment and/or the interior environment of the vehicle 10. The sensing devices 40a-40n can include, but are not limited to, radars, lidars, global positioning systems, optical cameras, thermal cameras, ultrasonic sensors, inertial measurement units, and/or other sensors. The actuator system 30 includes one or more actuator devices 42a-42n that control one or more vehicle features such as, but not limited to, the propulsion system 20, the transmission system 22, and the steering system 24. In various embodiments, the vehicle features can further include interior and/or exterior vehicle features such as, but are not limited to, doors, a trunk, and cabin features such as air, music, lighting, etc.

As previously mentioned, the vehicle 10 includes the data storage device 32 and the controller 34. Similarly, the remote computing system 50 includes a data storage device 52 and a controller 54.

The data storage device 32 stores data for use in controlling the vehicle 10 and/or systems and components thereof, and the data storage device 52 stores data for use in controlling the remote computing system 50 and/or systems and components thereof. As can be appreciated, the data storage device 32 may be part of the controller 34, separate from the controller 34, or part of the controller 34 and part of a separate system, and the data storage device 52 may be part of the controller 54, separate from the controller 54, or part of the controller 54 and part of a separate system. The data storage devices 32 and 52 can be any suitable type of storage apparatuses, including various types of direct access storage and/or other memory devices. In one exemplary embodiment, the data storage devices 32 and 52 each comprise a program product from which a computer readable memory device can receive a program that executes one or more embodiments of one or more processes of the present disclosure, such as the steps of the process discussed further below in connection with FIGS. 4-8. In another exemplary embodiment, the program product may be directly stored in and/or otherwise accessed by the memory device and/or one or more other disks and/or other memory devices.

The controller 34 includes at least one processor 44, a communication bus 45, and a computer readable storage device or media 46, and the controller 54 includes at least one processor 64, a communication bus 65, and a computer readable storage device or media 66. The processors 44 and 64 perform the computation and control functions of the controllers 34 and 54, respectively. The processors 44 and 64 can be any custom made or commercially available processor, a central processing unit (CPU), a graphics processing unit (GPU), an auxiliary processor among several processors associated with the controllers 34 and 54, a semiconductor-based microprocessor (in the form of a microchip or chip set), a macroprocessor, any combination thereof, or generally any device for executing instructions. The computer readable storage device or media 46 and 66 may include volatile and nonvolatile storage in read-only memory (ROM), random-access memory (RAM), and keep-alive memory (KAM), for example. KAM is a persistent or nonvolatile memory that may be used to store various operating variables while the processors 44 and 64 are powered down. The computer-readable storage device or media 46 and 66 may be implemented using any of a number of known memory devices such as PROMs (programmable read-only memory), EPROMS (electrically PROM), EEPROMs (electrically erasable PROM), flash memory, or any other electric, magnetic, optical, or combination memory devices capable of storing data, some of which represent executable instructions, used by the controllers 34 and 64 in controlling the vehicle 10 and the remote computing system 50, respectively. The buses 45 and 65 serve to transmit programs, data, status and other information or signals between the various components of the vehicle 10 and the components of the remote computing system 50, respectively. The buses 45 and 65 can be any suitable physical or logical means of connecting computer systems and components. This includes, but is not limited to, direct hard-wired connections, fiber optics, infrared, and wireless bus technologies.

The instructions may include one or more separate programs, each of which comprises an ordered listing of executable instructions for implementing logical functions. The instructions, when executed by the processors 44 and 64, receive and process signals from the sensor system, perform logic, calculations, methods and/or algorithms, and generate data based on the logic, calculations, methods, and/or algorithms. Although only one controller 34 and one controller 54 are shown in FIG. 1, embodiments of the vehicle 10 and the remote computing system 50 can include any number of controllers 34 and 54 that communicate over any suitable communication medium or a combination of communication mediums and that cooperate to process the sensor signals, perform logic, calculations, methods, and/or algorithms, and generate data.

As can be appreciated, that the controllers 34 and 54 may otherwise differ from the embodiments depicted in FIG. 1. For example, the controllers 34 and/or 54 may be coupled to or may otherwise utilize one or more remote computer systems and/or other control systems, for example as part of one or more of the above-identified vehicle devices and systems. It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processors 44 or 64) to perform and execute the program. Such a program product may take a variety of forms, and the present disclosure applies equally regardless of the particular type of computer-readable signal bearing media used to carry out the distribution. Examples of signal bearing media include recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controllers 34 and 54 may also otherwise differ from the embodiment depicted in FIG. 1, for example in that the respective computer systems of the controllers 34 and 54 may be coupled to or may otherwise utilize one or more remote computer systems and/or other control systems.

The remote computing system 50 may include various systems, devices, and/or components. In various embodiments, the remote computing system 50 includes one or more backend server systems, which may be cloud-based, network-based, or resident at a particular campus or geographical location. The remote computing system 50 can be manned by a live operator, or an automated operator, or a combination of both. The remote computing system 50 can communicate with the vehicle 10 to collect data for analysis. In various embodiments, the remote computing system 50 stores account information such as vehicle identifiers, vehicle performance patterns, historical information, fleet information, and other pertinent information.

The communication system 36 is configured to communicate information to and from other entities, such as but not limited to, other vehicles ("V2V" communication,) infrastructure ("V2I" communication), remote systems (e.g., the remote computing system 50), and/or personal devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The communication network 48 supports communication as needed between devices, systems, and components of the vehicle 10 and the remote computing system 50 (e.g., via tangible communication links and/or wireless communication links). For example, the communication network 48 can include a wireless carrier system such as a cellular telephone system that includes a plurality of cell towers (not shown), one or more mobile switching centers (MSCs) (not shown), as well as any other networking components required to connect the wireless carrier system with a land communications system. Each cell tower includes sending and receiving antennas and a base station, with the base stations from different cell towers being connected to the MSC either directly or via intermediary equipment such as a base station controller. The wireless carrier system can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

As another example, the communication network 48 can include a satellite communication system that provides uni-directional or bi-directional communication with the vehicle 10. This can be done using one or more communication satellites (not shown) and an uplink transmitting station (not shown). Uni-directional communication can include, for example, satellite radio services, wherein programming content (news, music, etc.) is received by the transmitting station, packaged for upload, and then sent to the satellite, which broadcasts the programming to subscribers. Bi-directional communication can include, for example, satellite telephony services using the satellite to relay telephone communications between the vehicle 10 and the station. The satellite telephony can be utilized either in addition to or in lieu of the wireless carrier system.

A land communication system may further be included that is a conventional land-based telecommunications network connected to one or more landline telephones and connects the wireless carrier system to the remote computing system 50. For example, the land communication system may include a public switched telephone network (PSTN) such as that used to provide hardwired telephony, packet-switched data communications, and the Internet infrastructure. One or more segments of the land communication system can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote computing system 50 need not be connected via the land communication system, but can include wireless telephony equipment so that it can communicate directly with a wireless network, such as the wireless carrier system.

In addition, the communication network 48 may include one more user devices. The user device(s) can be realized in any common form factor including, but not limited to: a desktop computer; a mobile computer (e.g., a tablet computer, a laptop computer, or a netbook computer); a smartphone; a wearable computing device (e.g., smart watch, smart glasses, smart clothing); or the like. Each user device is realized as a computer-implemented or computer-based device having the hardware, software, firmware, and/or processing logic needed to carry out the various techniques and methodologies described herein. For example, the user device may include a microprocessor in the form of a programmable device that includes one or more instructions stored in an internal memory structure and applied to receive binary input to create binary output. In some embodiments, the user device includes a GPS module capable of receiving GPS satellite signals and generating GPS coordinates based on those signals. In other embodiments, the user device includes cellular communications functionality such that the device carries out voice and/or data communications over the communication network 48 using one or more cellular communications protocols, as are discussed herein. In various embodiments, the user device may include an electronic device configured to physically couple with the vehicle 10 for transferring data therebetween, such as an OBD-II code reader or the like.

In various embodiments, one or more instructions of the controller 34 are embodied in the system 100 and, when executed by the processors 44 and 64, are configured to selectively collect data associated with the vehicle 10, transmit at least portions of the collected data to the remote computing system 50 through the communication network 48, and analyze the collected data with the remote computing system 50 to determine, for example, statistical information associated with the vehicle 10.

Figure 2:
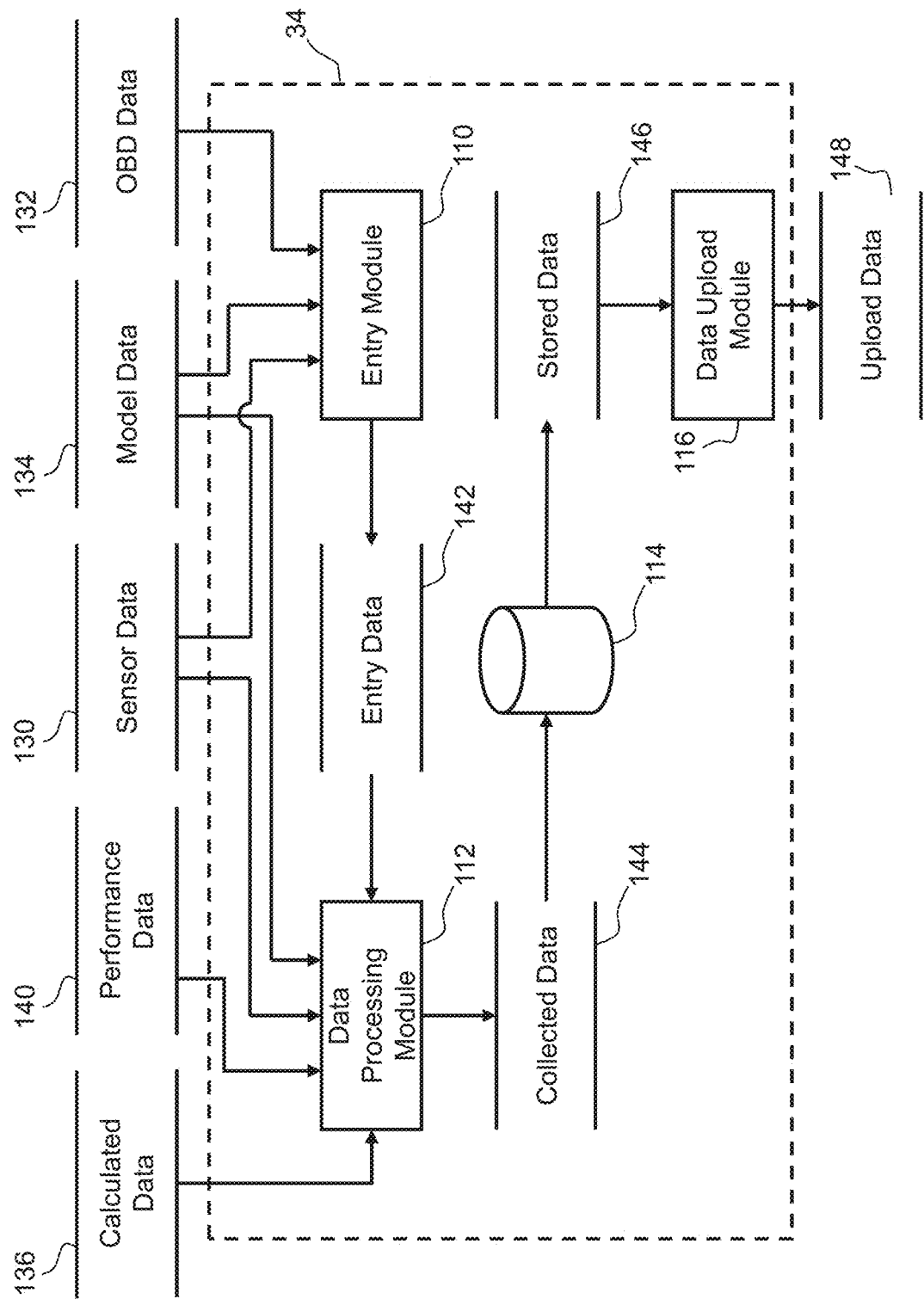
FIGS. 2 and 3 are dataflow diagrams illustrating elements of the system of FIG. 1, in accordance with various embodiments.
Figure 3:
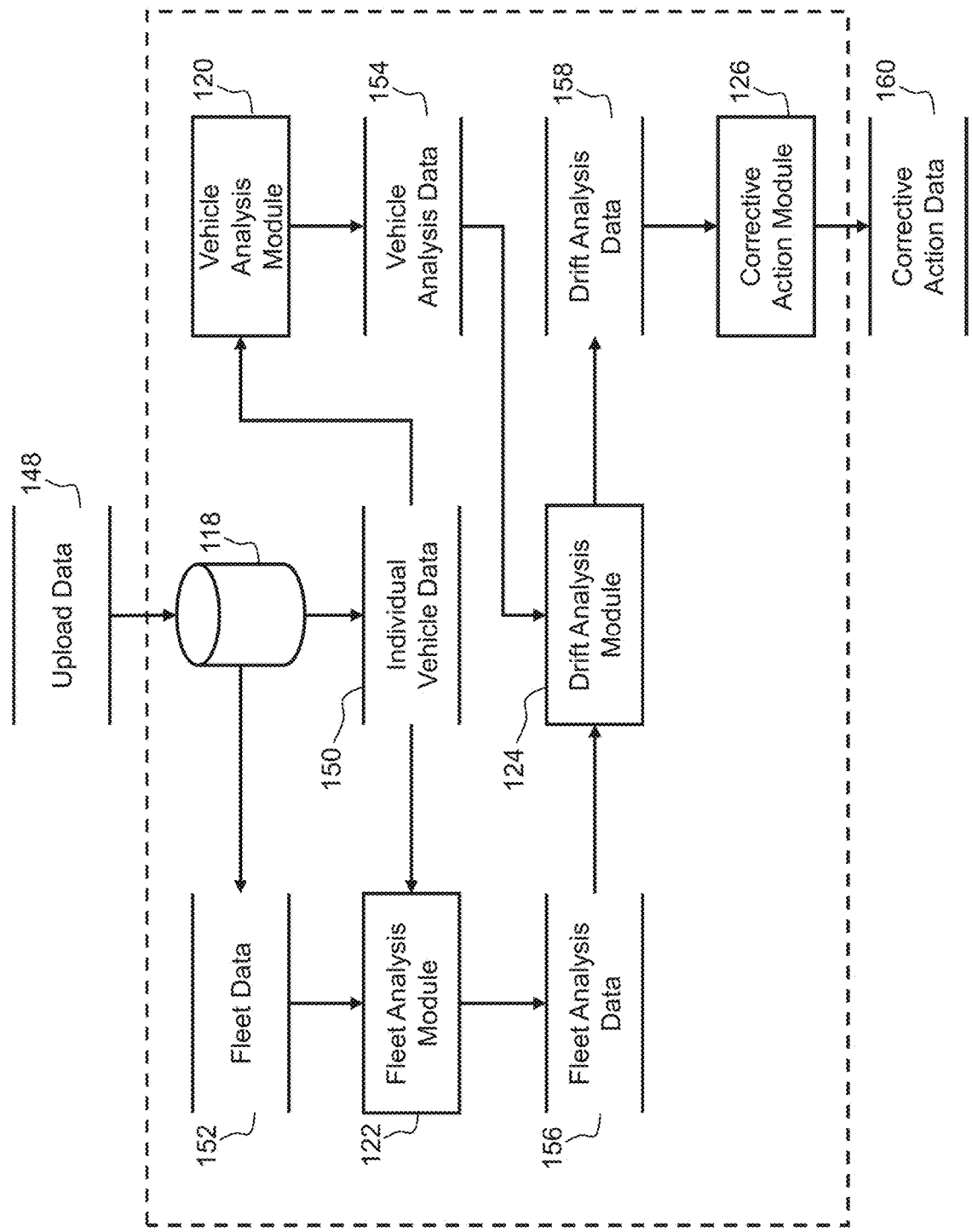

With reference to FIGS. 2 and 3 and with continued reference to FIG. 1, dataflow diagrams illustrate elements of the system 100 of FIG. 1 in accordance with various embodiments. As can be appreciated, various embodiments of the system 100 according to the present disclosure may include any number of modules embedded within the controller 34 and/or the controller 54 which may be combined and/or further partitioned to similarly implement systems and methods described herein. Furthermore, inputs to the system 100 may be received from other control modules (not shown) associated with the vehicle 10 and/or the remote computing system 50, and/or determined/modeled by other sub-modules (not shown) within the controllers 34 and 54. Furthermore, the inputs might also be subjected to preprocessing, such as sub-sampling, noise-reduction, normalization, feature-extraction, missing data reduction, and the like. In various embodiments, the system 100 includes, onboard the vehicle 10: an entry module 110, a data collection and processing module 112, a database 114, and a data upload module 116, and, on the remote computing system 50: a database 118, a vehicle analysis module 120, a fleet analysis module 122, a drift analysis module 124, and a corrective action module 126.

In various embodiments, the entry module 110 receives as input sensor data 130 generated by the sensor system 28, onboard diagnostics (OBD) data 132 generated by an OBD system 31, and model data 134 generated by a processor onboard the vehicle 10 or stored thereon. The sensor data 130 includes various data indicating sensed observable conditions of an exterior environment and/or an interior environment of the vehicle 10. The OBD data 132 includes various data indicating a status of the OBD system 31 and a determination as to whether the OBD system has been tampered with or modified subsequent to manufacture. For example, the OBD data 132 indicate whether a calibration identification (CALID) and a calibration verification number (CVN) of the vehicle 10 matches a CALID and a CVN of the manufacturer of the vehicle 10. The model data 134 includes various data indicating predictions relating to the observable conditions of the vehicle 10 based on the operation thereof.

The entry module 110 performs an analysis of the sensor data 130, the OBD data 132, and the model data 134 to determine whether preprogrammed data collection entry conditions are met. As an example, the entry conditions may include, but are not limited to, a determination that the are no active faults reported for the OBD system 31, the CALID and the CVN of the vehicle 10 matches the CALID and the CVN of the manufacturer, the vehicle 10 is operating in a specific mode or within certain conditions/criteria, and/or the model data 134 contains certain predictions for the observable condition of the vehicle 10. When the entry conditions are met, the entry module 110 generates entry data 142 that includes various data indicating that the entry conditions are met. In this manner, the system 100 is able to filter the data and only collect data for analysis under predetermined conditions.

In various embodiments, the data collection and processing module 112 receives as input the sensor data 130, the model data 134, calculated data 136 generated by a processor onboard the vehicle 10, the entry data 138, and performance data 140 generated by the sensor system 28. The calculated data 136 includes various data generated based on both the sensor data 130 and the model data 134. The performance data 140 includes various data indicating actual emissions of the vehicle 10 as sensed by the sensor system 28 for a period corresponding to the sensor data 130. In various embodiments, the sensor data 130, the model data 134, the calculated data 136 and the performance data 140 in combination may be referred to as vehicle data.

Upon a determination that the entry conditions are met, the data collection and processing module 112 obtains a snapshot of the sensor data 130, the model data 134, the calculated data 136, the entry data 138, and the performance data 140. As used herein, a snapshot of data refers to a substantially instantaneous collection of data at a point in time. The data collection and processing module 112 then bins the snapshot of the collected data based on preprogrammed inputs to enable post-processing of the performance of the vehicle 10 relating to the observable conditions. The data collection and processing module 112 generates collected data 144 that includes various data indicating the performance of the vehicle 10 relating to the observable conditions and transmits the collected data 144 to the database 114 for storage therein as stored data 146.

The database 114 may store the stored data 146 with a first register identifying a last value (t−1) of the stored data 146 and a second register identifying a current value (t) of the stored data 146. By referencing these registers, the system 100 reduces the likelihood that the stored data 146 will be overwritten prior to upload thereof.

In various embodiments, the data upload module 116 retrieves and/or receives as input the stored data 146. The data upload module 116 performs an analysis of the stored data 146 to determine whether and when to upload the stored data 146 to the remote computing system 50 as upload data 148. In various embodiments, the determination may be based on a data collection trigger or threshold such as, but not limited to, a preprogrammed mileage, time, and/or event. Upon the determination that the stored data 146 should be uploaded, the data upload module 116 generates the upload data 148 that includes various data including the stored data 146 and transmits, via the communication network 48, the upload data 148 to the database 118 at the remote computing system 50 for storage therein as individual vehicle data 150.

In various embodiments, the vehicle analysis module 120 retrieves and/or receives as input the individual vehicle data 150 stored in the database 118. The vehicle analysis module 120 performs a statistical analysis of the performance of the vehicle 10 relating to the observable conditions. The vehicle analysis module 120 generates vehicle analysis data 154 that includes various data indicating the performance of the vehicle 10.

In various embodiments, the fleet analysis module 122 retrieves and/or receives as input the individual vehicle data 150 and fleet data 152 stored in the database 118. The fleet data 152 includes various data indicating performance relating to the observable conditions of a plurality of vehicles within a fleet of which the vehicle 10 is a member based on fleet population criteria. For example, the fleet may include all or a portion of vehicles produced by a manufacturer for a specific year, make, and model corresponding to the vehicle 10.

The fleet analysis module 122 combines the individual vehicle data 150 with the fleet data 152 and performs a statistical analysis of the performance of the entire fleet. The fleet analysis module 122 generates fleet analysis data 156 that includes various data indicating the performance of the fleet.

In various embodiments, the drift analysis module 124 receives as input the vehicle analysis data 154 and the fleet analysis data 156. The drift analysis module 124 performs an analysis of the vehicle analysis data 154 and the fleet analysis data 156 to identify any significant performance drift/change of the vehicle 10. In some embodiments, the analysis may determine any performance change of the vehicle 10 over time based on historical data of the vehicle 10. In some embodiments, the analysis may determine any performance change of the vehicle 10 relative to the entire fleet. The drift analysis module 124 generates drift analysis data 158 that includes various data indicating significant performance drift of the vehicle 10, such as over time and/or relative to the fleet.

In various embodiments, the corrective action module 126 receives as input the drift analysis data 158. The corrective action module 126 performs an analysis of the drift analysis data 158 and determines what, if any, corrective action is recommended, for example, based on preprogrammed criteria. The corrective action module 126 generates corrective data 160 that includes various data indicating the recommended corrective actions. For example, the recommended corrective actions may include improvements to modeling algorithms, modifications to vehicle hardware, regulatory compliance, etc. In some embodiments, the corrective data 160, or data derived therefrom, may be transmitted to the vehicle 10 via the communication network 48 to, for example, make software modifications to one or more programs thereof or provide a recommendation to a user of the vehicle 10 (e.g., obtain emissions test, repairs, etc.)

Figure 4:
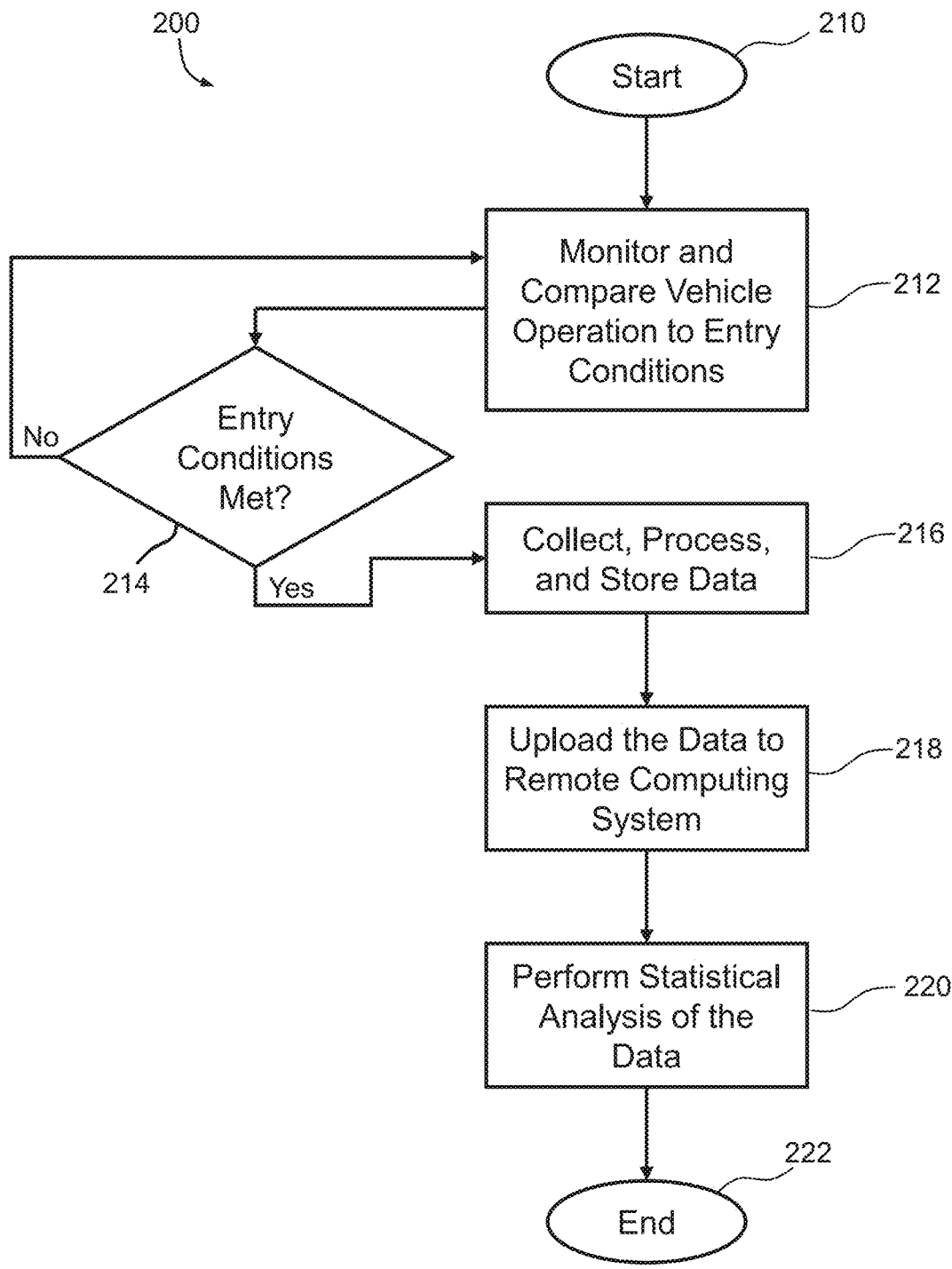
FIG. 4 is flowchart of a process for promoting data collection and analysis as performed by the system of FIG. 1, in accordance with various embodiments.

With reference now to FIG. 4 and with continued reference to FIGS. 1-3, a flowchart provides a method 200 for data collection and analysis as performed by the system 100, in accordance with exemplary embodiments. As can be appreciated in light of the disclosure, the order of operation within the method 200 is not limited to the sequential execution as illustrated in FIG. 4, but may be performed in one or more varying orders as applicable and in accordance with the present disclosure. In various embodiments, the method 200 can be scheduled to run based on one or more predetermined events, and/or can run continuously during operation of the vehicle 10.

In one example, the method 200 may start at 210. At 212, the method 200 may include monitoring and comparing the operation of the vehicle 10 to preprogramed entry conditions with the controller 34. If the entry conditions are met at 214, the method 200 may include, at 216, collecting, processing, and storing data relating to the performance of the vehicle 10 with the controller 34. At 218, the method 200 may include uploading the data to the remote computing system 50. At 220, the method 200 may include preforming, with the controller 54, statistical analysis of the data. The method 200 may end at 222.

Figure 5:
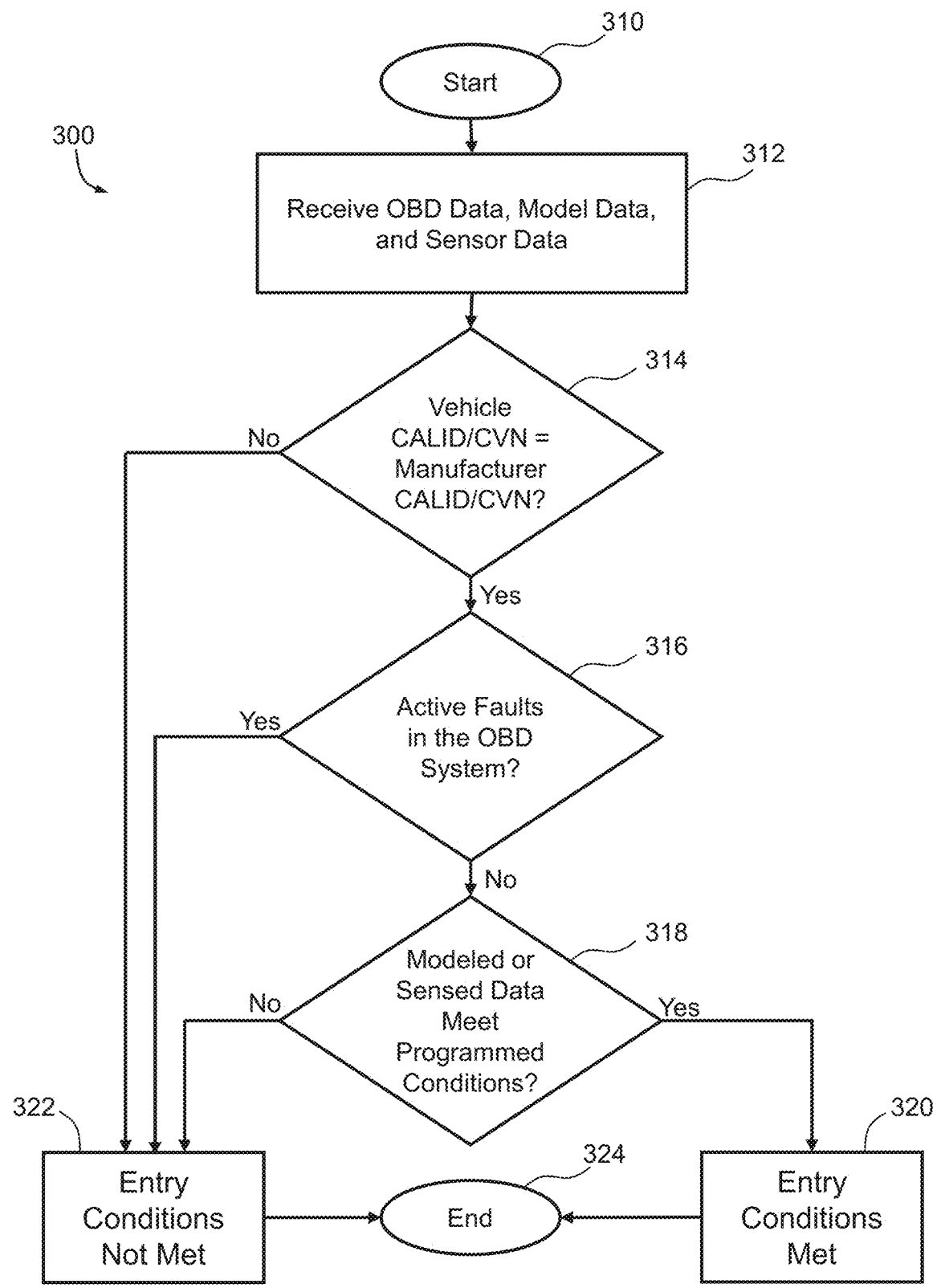
FIG. 5 is flowchart of a process for assessing entry conditions as performed by the system of FIG. 1, in accordance with various embodiments.

With reference now to FIG. 5 and with continued reference to FIGS. 1-4, a flowchart provides a method 300 for determining whether entry conditions are met, such as at 214 of the method 200 of FIG. 4, as performed by the system 100, in accordance with exemplary embodiments. The method 300 may start at 310. At 312, the method 300 may include receiving OBD data, model data, and sensor data. At, 314, the method 300 may include determining whether the CALID and CVN of the vehicle 10 matches the CALID and CVN of the manufacturer for the vehicle 10. If these identifiers match at 314, the method 300 may include determining, at 316, whether any faults are active in the OBD system. If there are no faults detected at 316, the method 300 may include determining, at 318, whether the modeled data and/or the sensed data meet the requirements of preprogrammed conditions. If either of these data sets meet their respective preprogrammed conditions at 318, the method 300 may determine that the entry conditions are met at 320. If the identifiers do not match at 314, faults are active at 316, or neither of the data sets meet their respective preprogrammed conditions at 318, then the method 300 may determine that the entry conditions are not met at 322. The method 300 may end at 324.

Figure 6:
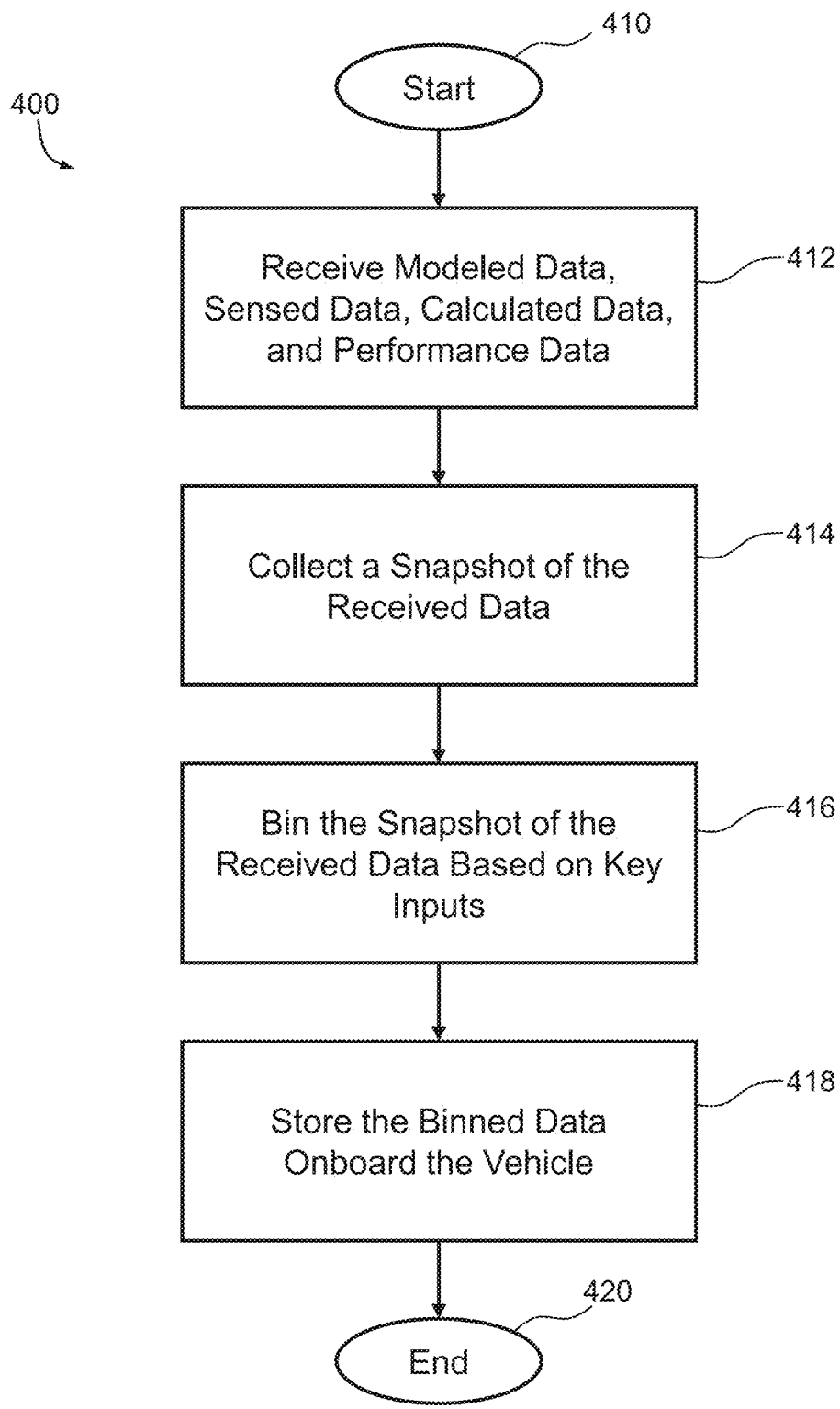
FIG. 6 is flowchart of a process for collecting and storing data as performed by the system of FIG. 1, in accordance with various embodiments.

With reference now to FIG. 6 and with continued reference to FIGS. 1-5, a flowchart provides a method 400 for collecting, processing, and storing data, such as at 216 of the method 200 of FIG. 4, as performed by the system 100, in accordance with exemplary embodiments. The method 400 may start at 410. At 412, the method 400 may include receiving modeled data, sensed data, calculated data, and performance data of the vehicle 10. At 414, the method 400 may include collecting a snapshot of the received data. At 416, the method 400 may include binning the snapshot of the received data based on predetermined inputs. At 418, the method 400 may include storing the binned data onboard the vehicle 10, such as within the data storage device 32 or the controller 34. The method 400 may end at 420.

Figure 7:
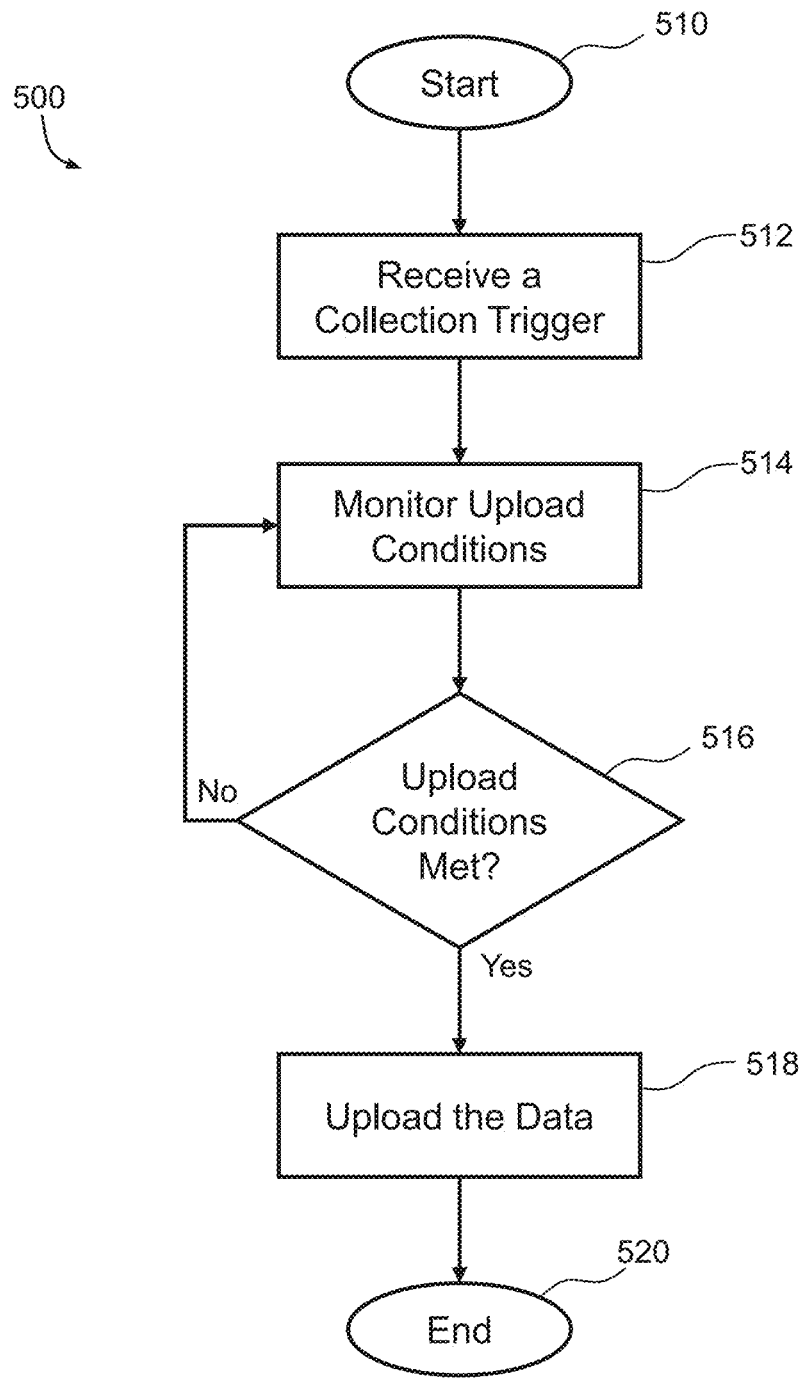
FIG. 7 is flowchart of a process for uploading data as performed by the system of FIG. 1, in accordance with various embodiments.

With reference now to FIG. 7 and with continued reference to FIGS. 1-6, a flowchart provides a method 500 for uploading data, such as at 218 of the method 200 of FIG. 4, as performed by the system 100, in accordance with exemplary embodiments. The method 500 may start at 510. At 512, the method 500 may include receiving a collection trigger. At 514, the method 500 may include monitoring for upload conditions in response to receiving the collection trigger. If the upload conditions are met at 516, the method 500 may include uploading, at 518, the data to the remote computing system 50. If the upload conditions are not met at 516, the method 500 may include continuing to monitor the upload conditions at 514. The method 500 may end at 520.

Figure 8:
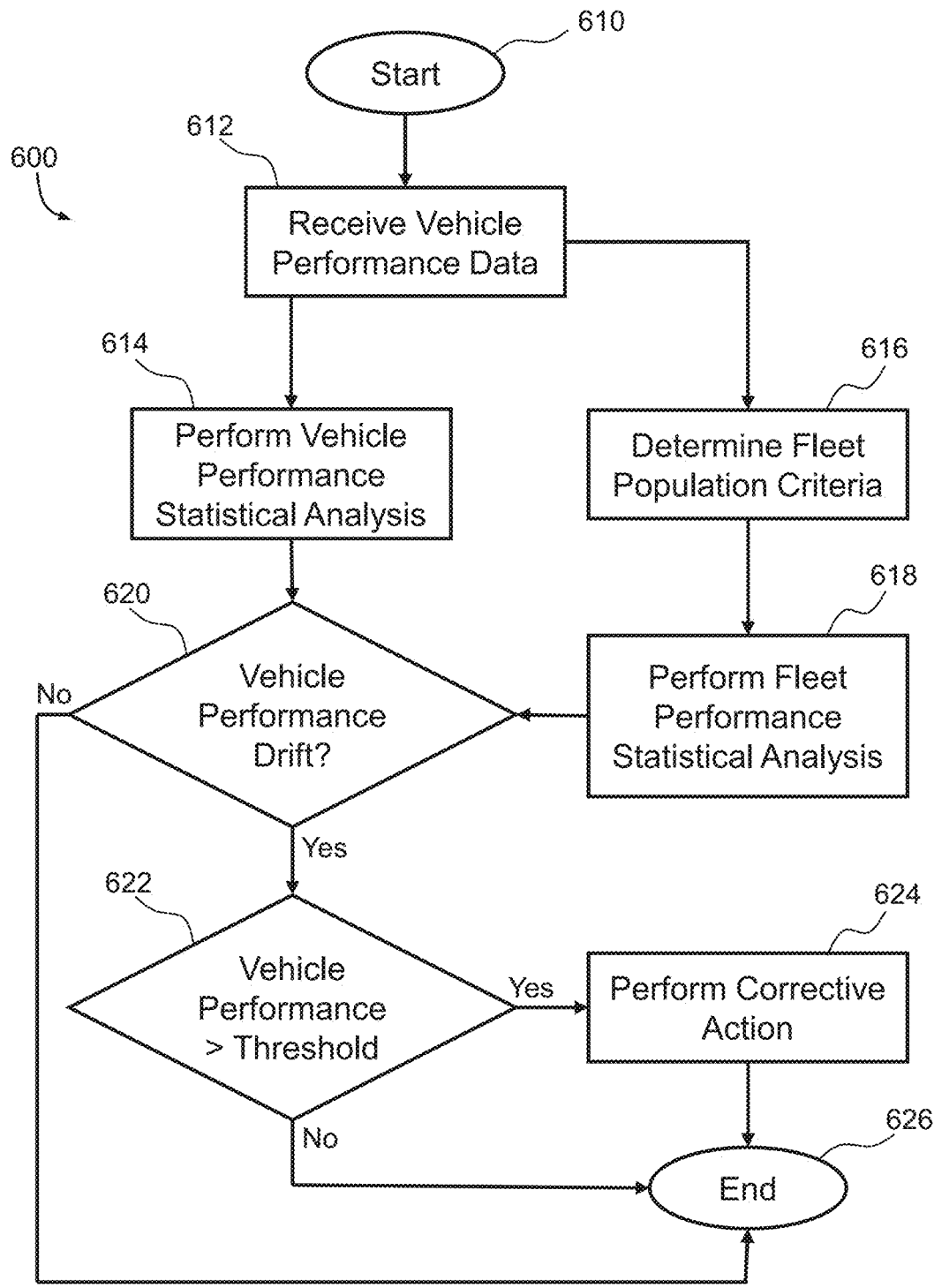
FIG. 8 is flowchart of a process for data analysis as performed by the system of FIG. 1, in accordance with various embodiments.

With reference now to FIG. 8 and with continued reference to FIGS. 1-7, a flowchart provides a method 600 for performing statistical analysis of the performance of the vehicle 10, such as at 220 of the method 200 of FIG. 4, as performed by the system 100, in accordance with exemplary embodiments. The method 600 may start at 610. At 612, the method 600 includes receiving performance data of the vehicle 10. At 614, the method 600 includes performing statistical analysis of the performance data. At 616, the method 600 includes determining fleet population criteria. At 618, the method 600 includes performing statistical analysis of the fleet associated with the vehicle 10. At 620, the method 600 includes determining whether a drift in the performance of the vehicle 10 has occurred, for example, relative to a history of the vehicle 10 or relative to the fleet. If the drift of the performance of the vehicle 10 has occurred at 620, the method 600 includes determining, at 622, whether the vehicle performance is greater than a threshold corresponding to a performance variable of interest, such as a regulatory limitation. If greater than the threshold at 622, the method 500 may optionally perform one or more corrective actions at 624. Once the corrective action(s) have been performed, or if the vehicle performance is less than the threshold at 622, the method 600 may end at 626.

In a first nonlimiting example of a specific application, the system 100 may be used to collect and analyze information relating to emissions of the vehicle 10. In this example, at least one of the sensing devices 40a-40n of the sensor system 28 is configured to sense a concentration of at least one element or component within the exhaust gas of the exhaust system 33, preferably downstream of the emissions control system 35. For example, the system 100 may include a nitrogen oxides ($NO_x$) sensing device 40a downstream of the emissions control system 35.

In this example, the entry conditions may include, but are not limited to, one or more predefined air/fuel ratios, exhaust volume flows, and/or catalyst/exhaust temperature levels. Upon determining that the entry conditions are met, the system 100 may collect a snapshot of data, such as exhaust flowrates, air/fuel ratios, catalyst temperatures, modeled $NO_x$ concentrations, and sensed $NO_x$ concentrations. The collected data may be processed to assign the collected data to one or more pre-defined $NO_x$ emission bins based on, for example, the exhaust flowrates, air/fuel ratios, and catalyst temperatures. The binned data may be stored onboard the vehicle 10 in two registers, keeping a last value and a current value of the binned data, to avoid overwriting data that has not been uploaded to the remote computing system 50. The upload conditions may include a travel distance of the vehicle 10. For example, if the stored data has not been uploaded for a specific distance (e.g., 100 km), then the system 100 may enable upload of the stored data, optionally along with a mileage of the vehicle 10.

Once uploaded, the remote computing system 50 may perform a statistical analysis on the uploaded data of the vehicle 10, for example, comparing historical emissions data of the vehicle 10 over time to detect an emission drift, in this instance, an increase in the concentrations of the $NO_x$ in the exhaust gas, if the emissions of the vehicle 10 exceeds a specific statistical threshold (e.g., mean of the data plus a predefined sigma of separation) relative to time. In addition, the uploaded data may be combined with emissions data of a fleet of similar vehicles, and a statistical analysis of the fleet emissions data may be performed to detect the emission drift if the emissions of the vehicle 10 exceeds a specific statistical threshold (e.g., mean of the fleet emission data plus a predefined sigma of separation) relative to the fleet. Optionally, historical emissions data of the fleet may be analyzed to determine emissions shifts over time. The above noted sigmas may be determined based on means and standard deviations of the uploaded data and the fleet data. Emissions performance exceeding the corresponding sigma can be identified as an outlier. In this example, corrective actions may include notifying the owner of the vehicle 10 that maintenance or repairs are recommended to address the emissions performance, recommending emissions testing, and/or using the data for reporting requirements of emissions regulations.

In a second nonlimiting example of a specific application, the system 100 may be used to collect and analyze information relating to battery performance of the vehicle 10. In this example, the engine 21 is an electric engine powered by a battery, and at least one of the sensing devices 40a-40n of the sensor system 28 is configured to sense one or more operating parameters of the battery.

In this example, the entry conditions may include, but are not limited to, sensed battery temperatures, sensed battery voltage, sensed ambient temperatures, sensed battery current, calculated/modeled state of charge, sensed distance since last battery state of health (SOH) update/reset (mileage or odometer), torque request, etc. Upon determining that the entry conditions are met, the system 100 may collect a snapshot of data, such as calculated battery state of health (SOH), recent calculated capacity, sensed battery current, calculated/modeled state of charge, depth of discharge, sensed distance since last battery state of health (SOH) update/reset (mileage or odometer), battery energy in reserve (constant value), useable battery energy, range, etc. The collected data may be processed to assign the collected data to one or more pre-defined battery performance bins based on, for example, the battery temperature, ambient temperature, torque request, useable battery energy, range, etc.

Once uploaded, the remote computing system 50 may perform a statistical analysis on the uploaded data of the vehicle 10, for example, comparing historical battery performance data of the vehicle 10 over time to detect a battery performance drift, in this instance, recent calculated capacity and/or battery state of health (SOH), if the performance of the battery exceeds a specific statistical threshold (e.g., mean of the data plus a predefined sigma of separation) relative to time. In addition, the uploaded data may be combined with battery performance data of a fleet of similar vehicles, and a statistical analysis of the fleet battery performance data may be performed to detect the battery performance drift if the battery performance of the vehicle 10 exceeds a specific statistical threshold (e.g., mean of the fleet emission data plus a predefined sigma of separation) relative to the fleet. Optionally, historical battery performance data of the fleet may be analyzed to determine performance shifts over time. In this example, corrective actions may include notifying the owner of the vehicle 10 that maintenance or repairs are recommended to address the battery performance (e.g., replacing the battery).

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method comprising:
   receiving, with one or more processors of a vehicle, vehicle data that includes sensor data including an observable condition of the vehicle as sensed with a sensing device of a sensor system of the vehicle;
   processing, by the one or more processors of the vehicle, the vehicle data to define collected data;
   storing, by the one or more processors of the vehicle, the collected data as stored data in a data storage device onboard the vehicle;
   uploading, by the processer one or more processors of the vehicle, the stored data through a communication network to a remote computing system with a communication system of the vehicle;
   performing statistical analysis of the stored data, with one or more processors of the remote computing system, to quantify a change in the observable condition of the vehicle relative to historical data associated with the vehicle and relative to other vehicles within a fleet associated with the vehicle;
   determining, by the one or more processors of the remote computing system, whether a drift in performance of the vehicle has occurred both over time and relative to the fleet based on the statistical analysis;
   determining, by the one or more processors of the remote computing system, whether the performance of the vehicle exceeds a preprogrammed performance condition in response to a determination that the drift in the performance of the vehicle has occurred; and
   performing, by the one or more processors of the remote computing system, a corrective action in response to the determination that the performance of the vehicle exceeds the preprogrammed performance condition, wherein the corrective action modifies operation of the vehicle.

2. The method of claim 1, further comprising, by the one or more processors of the vehicle:
   monitoring the sensor data;
   receiving and monitoring model data that includes an estimation of the observable condition of the vehicle;
   comparing the sensor data and the model data to preprogrammed entry conditions; and
   processing the vehicle data in response to a determination that at least one of the sensor data and the model data meet the entry conditions.

3. The method of claim 2, further comprising, by the one or more processors of the vehicle:
   determining whether a calibration identification (CALID) and a calibration verification number (CVN) of the vehicle matches a CALID and a CVN of a manufacturer for the vehicle;
   determining whether faults are active in an onboard diagnostics (OBD) system of the vehicle; and
   determining that the entry conditions are not met if the CALID or the CVN of the vehicle does not match the CALID or the CVN of the manufacturer for the vehicle, or if active faults are detected in the OBD system.

4. The method of claim 1, further comprising, by the one or more processors of the vehicle:
   receiving the sensor data, model data that includes an estimation of the observable condition of the vehicle, calculated data that includes values determined based on both the sensor data and the model data, and performance data that includes information related to operation of the vehicle;

collecting a snapshot of the sensor data, the model data, the calculated data, and the performance data to define the vehicle data; and binning the vehicle data based on predetermined inputs to produce the collected data.

5. The method of claim 1, further comprising, by the one or more processors of the vehicle:

detecting a collection trigger indicating that the stored data is stored in the data storage device of the vehicle;

monitoring for fulfillment of preprogrammed upload conditions; and uploading the stored data to the remote computing system in response to a determination that the upload conditions are fulfilled.

6. A system comprising:

a vehicle that includes a sensor system having a sensing device configured to sense an observable condition of the vehicle, a communication system configured to communicate information to and from a remote computing system that is remote from the vehicle, and a controller configured to, by one or more processors:

receive and monitor vehicle data including sensor data that includes the observable condition of the vehicle as sensed with the sensor system;

receive and monitor model data that includes an estimation of the observable condition of the vehicle;

compare the sensor data and the model data to preprogrammed entry conditions;

process the vehicle data to define collected data in response to a determination that at least one of the sensor data and the model data meet the entry conditions;

store the collected data as stored data in a data storage device onboard the vehicle; and upload the stored data through a communication network to the remote computing system with the communication system; and the remote computing system that includes a controller configured to, by one or more processors:

receive the vehicle data from the vehicle;

perform statistical analysis of the vehicle data to quantify a change of the observable condition of the vehicle relative to historical data associated with the vehicle and relative to other vehicles within a fleet associated with the vehicle;

determine whether a drift in performance of the vehicle has occurred both over time and relative to the fleet based on the statistical analysis;

determine whether the performance of the vehicle exceeds a preprogrammed performance condition in response to the determination that the drift in the performance of the vehicle has occurred; and perform a corrective action in response to the determination that the performance of the vehicle exceeds the preprogrammed performance condition, wherein the corrective action modifies operation of the vehicle.

7. The system of claim 6, wherein the controller of the vehicle is configured to, by the one or more processors:

determine whether a calibration identification (CALID) and a calibration verification number (CVN) of the vehicle matches a CALID and a CVN of a manufacturer for the vehicle;

determine whether faults are active in an onboard diagnostics (OBD) system of the vehicle; and determine that are not met if the CALID or the CVN of the vehicle does not match the CALID or the CVN of the manufacturer for the vehicle, or if active faults are detected in the OBD system.

8. The system of claim 6, wherein the controller of the vehicle is configured to, by the one or more processors:

receive the sensor data, the model data that includes the estimation of the observable condition of the vehicle, calculated data that includes values determined based on both the sensor data and the model data, and performance data that includes information related to operation of the vehicle; and collect a snapshot of the sensor data, the model data, the calculated data, and the performance data to define the vehicle data.

9. The system of claim 6, wherein the controller of the vehicle is configured to, by the one or more processors:

detect a collection trigger indicating that the stored data is stored as in the data storage device of the vehicle;

monitor for fulfillment of preprogrammed upload conditions in response to detection of the collection trigger; and upload the stored data to the remote computing system in response to a determination that the upload conditions are fulfilled.

10. A system comprising:

a vehicle that includes a sensor system having a sensing device configured to sense an observable condition of the vehicle, a communication system configured to communicate information to and from a remote computing system that is remote from the vehicle, and a controller configured to, by one or more processors:

receive vehicle data including sensor data that includes the observable condition of the vehicle as sensed with the sensor system;

process the vehicle data to define collected data;

store the collected data as stored data in a data storage device onboard the vehicle; and upload the stored data through a communication network to the remote computing system with the communication system; and the remote computing system that includes a controller configured to, by one or more processors:

receive the vehicle data from the vehicle;

perform statistical analysis of the vehicle data to quantify a change of the observable condition of the vehicle relative to historical data associated with the vehicle and relative to other vehicles within a fleet associated with the vehicle;

determine whether a drift in performance of the vehicle has occurred both over time and relative to the fleet based on the statistical analysis;

determine whether the performance of the vehicle exceeds a preprogrammed performance condition in response to the determination that the drift in the performance of the vehicle has occurred; and perform a corrective action in response to the determination that the performance of the vehicle exceeds the preprogrammed performance condition, wherein the corrective action modifies operation of the vehicle.

11. The system of claim 10, wherein the remote computing system includes one or more backend server systems.

12. The system of claim 10, wherein the controller of the vehicle is configured to, by the processor one or more processors of the vehicle:
- monitor the sensor data;
- receive and monitor model data that includes an estimation of the observable condition of the vehicle;
- compare the sensor data and the model data to preprogrammed entry conditions; and
- process the vehicle data in response to a determination that at least one of the sensor data and the model data meet the entry conditions.

13. The system of claim 12, wherein the controller of the vehicle is configured to, by the one or more processors of the vehicle:
- determine whether a calibration identification (CALID) and a calibration verification number (CVN) of the vehicle matches a CALID and a CVN of a manufacturer for the vehicle;
- determine whether faults are active in an onboard diagnostics (OBD) system of the vehicle; and
- determine that the entry conditions are not met if the CALID or the CVN of the vehicle does not match the CALID or the CVN of the manufacturer for the vehicle, or if active faults are detected in the OBD system.

14. The system of claim 10, wherein the controller of the vehicle is configured to, by the one or more processors of the vehicle:
- receive the sensor data, model data that includes an estimation of the observable condition of the vehicle, calculated data that includes values determined based on both the sensor data and the model data, and performance data that includes information related to operation of the vehicle;
- collect a snapshot of the sensor data, the model data, the calculated data, and the performance data to define the vehicle data; and
- bin the vehicle data based on predetermined inputs to produce the collected data.

15. The system of claim 10, wherein the controller of the vehicle is configured to, by the one or more processors of the vehicle:
- detect a collection trigger indicating that the stored data is stored as in the data storage device of the vehicle;
- monitor for fulfillment of preprogrammed upload conditions in response to detection of the collection trigger; and
- upload the stored data to the remote computing system in response to a determination that the upload conditions are fulfilled.

* * * * *